(12) United States Patent
Mason, Jr.

(10) Patent No.: US 6,304,946 B1
(45) Date of Patent: Oct. 16, 2001

(54) SYSTEM AND METHOD FOR OPTIMIZING CACHE WRITE BACKS TO DISKS

(75) Inventor: Robert S. Mason, Jr., Mendon, MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 09/347,592

(22) Filed: Jul. 1, 1999

(51) Int. Cl.[7] .............................. G06F 12/08; G06F 7/00
(52) U.S. Cl. .......................... 711/143; 711/114; 711/118; 711/113; 707/2; 707/7
(58) Field of Search ..................................... 711/114, 141, 711/143, 113, 118, 121; 707/2, 7; 365/230.03, 230.05

(56) References Cited

U.S. PATENT DOCUMENTS 5,592,432 * 1/1997 Vishlitzky et al. ............. 365/230.03
5,768,211 * 6/1998 Jones et al. ..................... 365/230.05
5,953,685 * 9/1999 Bogin et al. ........................ 702/136

* cited by examiner

*Primary Examiner*—Matthew Kim
*Assistant Examiner*—Brian R. Peugh
(74) *Attorney, Agent, or Firm*—Brian L. Michaelis; David D. Lowry; Brown, Rudnick, Freed & Gesmer

(57) ABSTRACT

A system and method for increasing efficiency in a mass storage system such as a RAID (redundant array of inexpensive disks) array with a cache memory. Multi-host mass storage systems employ a data structure called a write tree. The write tree is stored in cache memory, and is used to mark addressable data elements stored in the cache memory which must be written back to disk (referred to as "destaging", or "write-backs"). Disks and disk controllers must scan and traverse the write tree to search for pending write operations. By storing a write tree cache apart from the write tree, the system efficiency is greatly increased. The write tree cache consists of a cylinder address as found in the write tree, and a bit mask indicating pending write operations at a specific level of the write tree. The specific disks and disk controllers can then avoid accessing the write tree in cache memory when searching for pending write operations.

18 Claims, 5 Drawing Sheets

SYSTEM AND METHOD FOR OPTIMIZING CACHE WRITE BACKS TO DISKS

BACKGROUND

Mass storage technology including RAID (redundant arrays of independent disks) are commonly used for computer systems, especially in the area of high volume transaction processing. Such mass storage systems typically employ a large number of disk drives which are accessible by multiple host processors, either locally or over networks (often at great geographical distances).

Although disks provide large storage capacity at low cost, the access speed for reading and writing can be negatively affected resulting in slowed performance. The read and write head of a disk is a mechanically controlled device, and it must be moved to the correct location on the disk cylinder surface in order to access the appropriate data. Other factors, including head settling time, and latency due to multiple accesses can increase the access time. Since reading and writing from disks is still a relatively slow operation, most disk data storage systems use a cache memory to speed up the transfer of information to/from the disks. The cache memory is a high-speed memory that can store, at any given time, a portion of the data stored in the main memory of a host system for transfer to/from data storage systems. The host processors need to efficiently interact with the high-speed memory (cache) on all transfers to/from storage.

Along with the complicated process of selecting information from the main memory to put in the cache, the system must maintain a mapping of what data is in the cache, and how this data is addressed. Many mass storage systems provide complete cache support, including the mapping of cache to main memory. This allows the host processors to simply request and receive data from the mass storage systems, without concern for cache maintenance and updating. For a read operation by a host processor, the host processor simply requests the data by address. If the requested data is in the cache, the data is provided directly from cache to the host processor without the extra time needed to obtain the data from the slower disks. If the data is not in the cache, then the mass storage system will have to obtain the data from disk and supply the data to cache in due time.

If data is written by a host processor back into memory, the changed data is written to the cache, and then at a later time written back (often called "destaging") to the disks. The operation of writing changed data back to a disk is referred to as a write-back. To maintain the integrity of the data, all write-backs must be performed in an expeditious manner. If multiple hosts are accessing common data, the importance of properly handling write-backs increases. The complexity of the mapping and record keeping for write-backs also increases.

This problem is prevalent in all systems using independent access arrays, and becomes even more complicated if there are multiple redundant disks maintaining the same data, i.e. RAID systems using "shadowing", "mirroring", parity-based or other check data based on redundancy techniques A system using RAID provides a high level of protection from data loss because the data is redundantly stored on more than one disk, and therefore a single disk failure will not cause a permanent loss of data. Further, RAID data systems can provide extra speed by allowing the multiple disks (mirrors) to function independently from each other. For example, in RAID implementations with two disks maintaining identical copies of data, random-access reads can be performed on whichever disk volume (mirror) can access the requested data more quickly due to the proximity of the reading head to the proper track for the data. With write-backs, the data must be written to both disk volumes, however not necessarily at the same time. Data can be written back to one disk volume while the other disk volume is busy, wherein the other disk volume will be written to in due time. This mirrored data storage provides both safety in the redundancy of data, and faster access from increased availability of the multiple sources of the requested data.

Such high availability systems which are often accessed by many hosts and which provide data redundancy on several mirrors for a volume place a very high priority on information retrieving and writing. Any system or method for increasing the speed of access to the data elements is extremely valuable. The cache is accessed by many different processors and components, and undue delay in accessing the cache memory must be avoided. In typical systems, the number of parties trying to access cache memory is very high. As previously stated, the host processors are trying to access the cache memory to read out data and write back data. Further, the disks and mirrors are also contending to access the cache memory both to put data into the cache memory from disks and perform write-backs to the disks. In effect, gaining access to the cache memory becomes the new bottleneck, in place of the bottleneck of slow host memory accesses directly from disks.

Another problem with cache memory is the need to maintain the integrity of the data elements in cache memory which have changed and must be written back to the disks. A data table or structure must be maintained which indicates what data elements in cache memory have been changed and therefore need to be written back to one or more disk volumes. As host processors write data back into the cache which has changed, the data table must be marked to indicate which data elements must be written back to the disk volumes. At other times when the disk volumes are available to destage the write backs, the data table must be cleared to indicate that the data element on one or more disk volume(s) now corresponds to the data element in the cache memory. Therefore, the data table or structure is often kept in the same cache memory, in a special location allowing multiple entities to access and mark and change the data table. Data tables may be created for several different types of data elements including various forms of meta data or formatting information including, for example, information on the state of the track, the state of the logical volume, and the state of the data itself, as well as conventional I/O data elements. A write-back of meta data may be referred to as a "format-back".

As part of speeding up the process of reading and writing to disks, many mass storage systems depend on using proximity data to allow reading and writing of data at approximately similar locations on a disk. As previously described, disks employ a read and write head which tracks back and forth across the surface of a cylinder (or multiple cylinders). If data reads and writes are performed in a sequential order which minimizes movement of the read and write head, the system avoids long delays introduced by head seeks.

Therefore, many systems attempt to select and sort disk writes to minimize the movement of the read and write head The data table for indicating write-backs is often set up to allow a disk (disk volume) looking to do a write-back to search for other localized write-backs and thereby increase speed. One such data table set up is known as a "write tree", where the data is arranged in a tree-like structure which is sorted by a predetermined index system, for example by cylinder number. This cylinder number for example corresponds to a real or virtual cylinder number on one or more disk volumes. The disk volumes are able to search the write tree by cylinder numbers for proximate write-backs, and thereby minimize the head movement necessary to write data to the disk volumes.

However, searching a write tree in cache memory is a slow operation which requires multiple accesses to find the appropriate data. All these accesses to cache memory have the effect of reducing performance of cache memory while the accesses are being performed. Using redundant logical volumes increases this problem, since each disk volume separately and independently searches the same write tree. Further, cache systems have many states where particular write-backs can not be performed at specific times. Examples of these states include sequential accessing operations on the disk volumes, or locks on particular sections of the disk volumes to purposely delay writes to a later time. It often occurs that the write tree is searched for a write-back, but that particular write back is refused by the disk volume or some other portion of the mass storage system. Therefore, many disk volume accesses to the write tree are wasted, since the detected write-back can not be performed at that time, and the disk volume or disk controller then discards that write-back attempt and performs other operations. All this results in further degradation of system performance.

SUMMARY

The present invention includes a system and method for caching data from a write tree to increase efficiency of a cached memory system. By locally caching the disk volume-specific data from a particular level of the write tree, each disk controller associated with a disk volume can avoid unnecessary accesses to the write tree when searching for pending write-backs, and thereby increase the overall efficiency of the system.

According to the invention, an illustrative embodiment of an integrated cache storage system includes a cache memory that is accessible by at least one host processor and at least one disk. The cache memory includes at least one write tree organized into a plurality of levels. The write tree entry indicates pending write operations to addressable units on a logical volume located on the disk. An addressable unit value is stored relating to a write tree entry, which provides an indication of an addressable unit found in the write tree. Stored along with the addressable unit value is a bit mask, which provides an indication of pending write operations to the disk that are at a same level in the write tree as the stored addressable unit value. In operation, the system checks the bit mask when searching for pending write operations to the disk. This avoids many accesses to the write tree stored in cache memory. A lowest level of the cache write tree is stored locally in a disk adapter. The disk adapter can then search locally (i.e. the lowest level of the tree corresponding to a given logical volume), and only have to search the remainder of the tree if there is no hit in the locally cached portion of the write tree.

The present invention is applicable to storage systems, including RAID systems with redundant volumes (mirroring), and RAID systems with parity disks, wherein at least one disk stores certain information at a specified addressable unit, and another disk stores related information (such as a parity of the certain information) at the same specified addressable unit.

Advantages of the present invention includes the ability to avoid many of the accesses necessary to cache in order to find proximate write-backs to disk. Further, the expense of retries for previously found but unperformed write-backs is greatly reduced Other advantages include requiring very little space to provide the caching for the write tree. Bus loading to/from cache is reduced by reducing the quantity of cache accesses.

Another advantage of the present invention is the flexibility of allowing different levels of the write tree to be cached, to allow configuring the system for optimal access depending on the data and type of architecture.

Another advantage of the present invention is an ability to cache all types of data which must be destaged to disks, such as meta data related to I/O data stored on disks. An example of such meta data is a format-back, which involves writing meta data onto a disk, such as the state of the volume on the disk, the state of the data on that volume, and/or information about each physical track on the disk. Meta data is more fully described in U.S. Pat. No. 5,544,347, which is incorporated herein by reference.

Yet another advantage of the present invention is a cache system which maintains coherency under all normal and error conditions, providing greatly increased efficiency with no reduction to fault tolerance.

BRIEF DESCRIPTION OF THE DRAWINGS

The foregoing and other features and advantages of the present invention will be more fully understood from the following detailed description of illustrative embodiments, taken in conjunction with the accompanying drawings in which.

DETAILED DESCRIPTION

Figure 1:
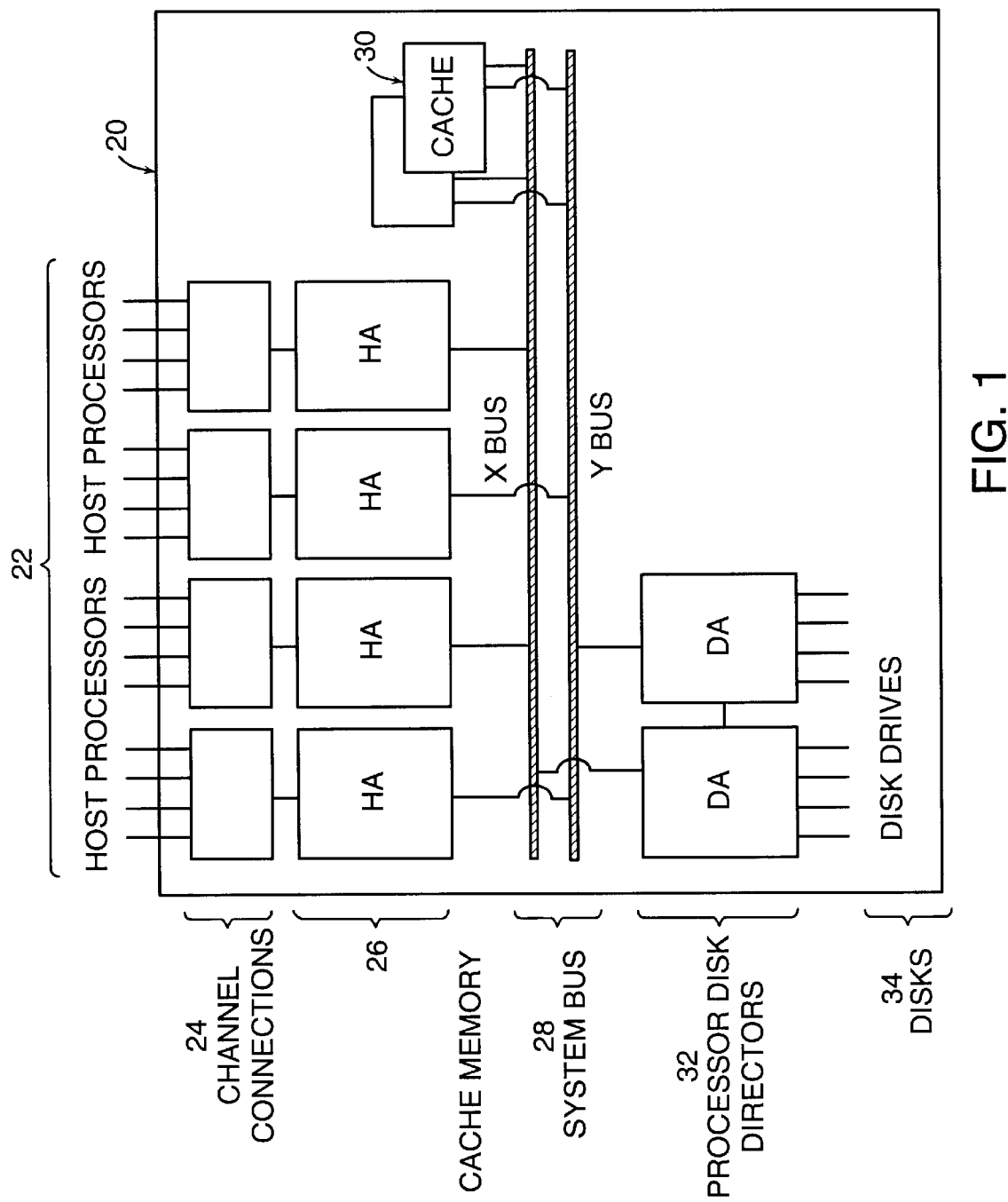
FIG. 1 is an overview of a storage system architecture utilizing disk arrays and a global cache memory.

An illustrative mass storage system architecture 20 is shown in FIG. 1. The architecture is illustrative of a Symmetrix 3000 Enterprise Storage Product as provided by EMC Corporation of Hopkinton, Mass. The system 20 interfaces with a plurality of host processors 22 either locally or remotely. The host processors 22 read from and write to the data storage system as provided by the disk volumes (disks) 34. One or more channel connectors 24 provide intermediate processing between the host processors 22 and the respective adapters 26. The host adapters 26 provide processing and mapping to allow the host processors to access the data.

The system 20 includes a plurality of system buses 28 to provide multiple access and contention resolution. In the present example, two system buses 28 are provided which are configured to provide communications between the host adapters 26, a cache memory 30 and disk adapters 32. The disk adapters 32 are connected to and provide control to the actual disk drives (hereinafter referred to as disk volumes) 34.

Figure 2:
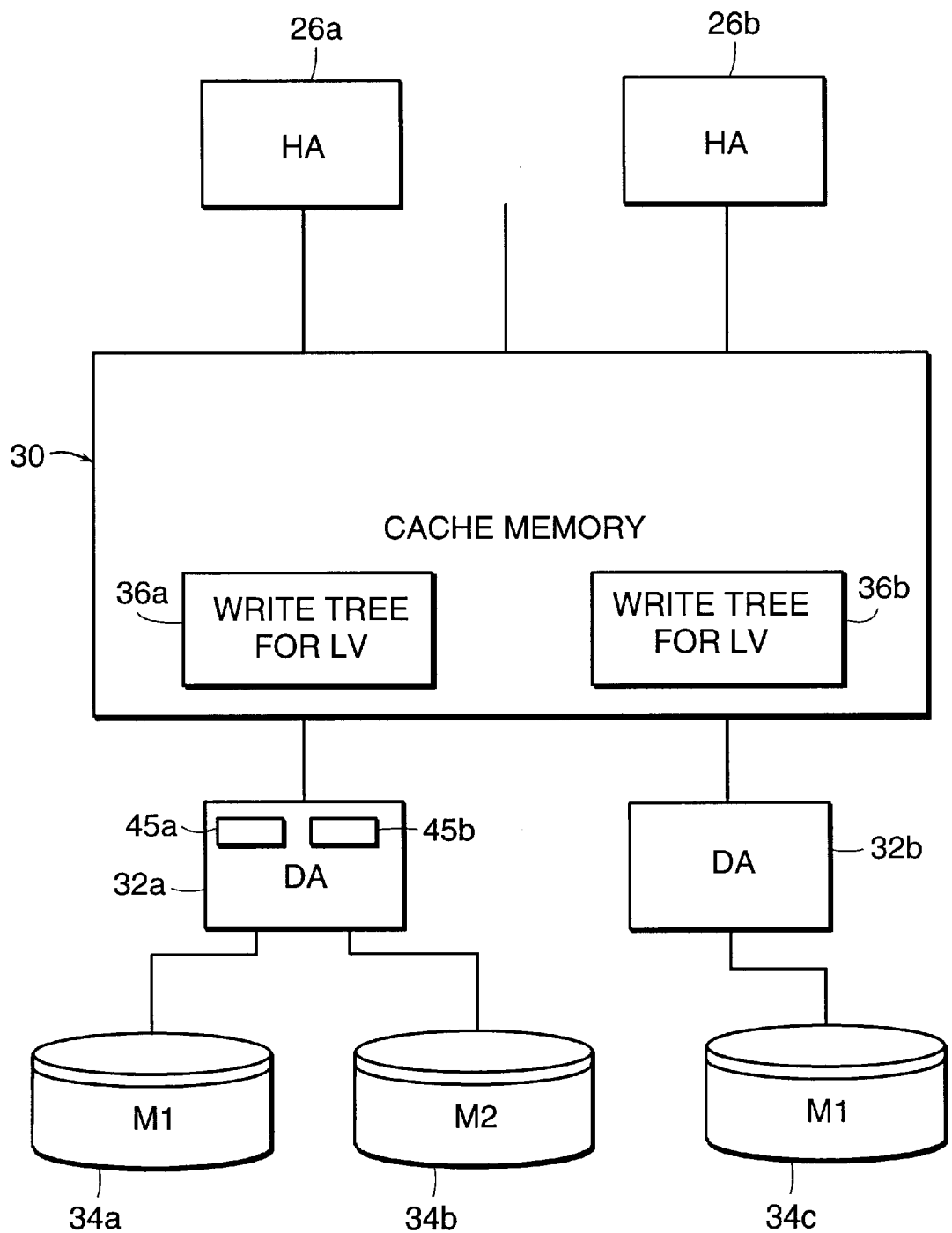
FIG. 2 is a block diagram of a global cache memory and disk arrays.

FIG. 2 shows a block diagram of several of the components as outlined in FIG. 1. For this example, two host adapters 26a–b have access to global memory 30 which is the cache memory. Two disk adapters 32a and 32b also have access to the cache memory 30. Here, the first disk adapter 32a is coupled to two disk volumes 34a and 34b. For this example, the disk volumes 34a and 34b are redundant disks (RAID) which each maintain copies of the stored data (mirroring). Reads and writes to mirrored data volumes are often performed asynchronously which increases the speed and efficiency of the system. This means that while all write-backs must be performed to both disk volumes, the first disk volume 34a may be written to at a different time than the second disk volume 34b. Although only two disk volumes are shown, multiple disk volumes are possible. The other disk adapter 32b is shown attached to the cache memory 30, with one disk volume 34c. In other implementations within the scope of the present invention a portion of a second disk volume contains redundant information corresponding to certain data stored on a first RAID volume such as parity data, rather than mirroring the first RAID volume exactly.

The disk volumes 34 can have two types or write operations performed on them: write backs and format backs. Write backs must be performed when data elements in cached memory 30 are modified by a host adapter 26, and therefore the modified data must be written out to the disk volumes 34 to maintain data coherence. Format backs also write information to the disk volumes 34, such as information concerning the status of the disk volume itself, and information stored on the disk volume 34. The system must keep track of which data on which disk volumes 34 require either write-backs or format-backs, as will be explained below, however the present invention works with any type of information which is written back to disk volumes 34, and can work with many different categories of information, not just write-backs and format-backs. Unless otherwise indicated "write-back" refers to both write-backs and format-backs.

To keep track of data elements in the cache memory 30 which must be written back to the disk volumes 34, a write tree 36 is maintained in cache memory 30. For each logical volume in the system (a logical volume, "LV," is a set of cylinders which form a virtual or physical disk, for example, the disk adapter 32A and disk volumes 34 form a logical volume), there is a write tree 36 of pending writes and pending formats that reside in the cache memory 30. In the illustrative embodiment, there is a write tree 36a for the first LV comprising disk adapter 32a and disk volumes 34a and b, and a write tree 36b for the second LV comprising the second disk adapter 32b and corresponding disk volume 34c. In a parity based RAID system, the write tree 36 contains information regarding write-backs to a first disk volume 34a storing I/O data, and information regarding parity write-backs to a second disk volume 34b storing parity information for the I/O data stored in the first disk volume 34a. Corresponding addressable unit indications are used to access both the I/O data on the first disk volume 34a and the parity data on the second disk volume 34b, as well as to store write-back information in the write tree 36. In an alternative implementation, the write trees for the write-backs and format-backs can also be separate but would operate in the same manner.

The purpose of the write tree 36 is to provide indications of data elements in the cache memory 30 which must be written out or de-staged to the disk volume(s) 34. The write tree 36 will reflect write back information for the logical volume for which it is providing write-backs. For the illustrative embodiment of the present invention, a disk volume is assumed to store 32 kilobytes of data per track, with 15 tracks per cylinder, and the number of possible cylinders in a logical volume is set at 32,767. Each disk volume 34 has (at most) this many possible addressable cylinders. To address all possible cylinders in this logical volume, a 2 byte address is used. Typically these addresses are represented in hexadecimal (base sixteen) which would cover the range of 0000 to 7FFF. This hexadecimal ("hex") address is taken by reading each four bit unit of the 2 byte address as a single character in hex.

This write tree 36 typically has a fixed structure which allows searching at various levels within the write tree 36. Fundamentally, a write tree 36 maintains a flag for each addressable data element in cache memory 30, which provides an indication of whether the data element has changed and therefore needs to be written out (destaged) to the disk volumes 34. The structure of the write tree 36 allows system components such as the disk adapters 32 to search for flags indicating writes which are proximate to each other, e.g., on the same or adjacent track, thereby requiring minimum movement of the heads on the disk volumes 34.

Figure 3:
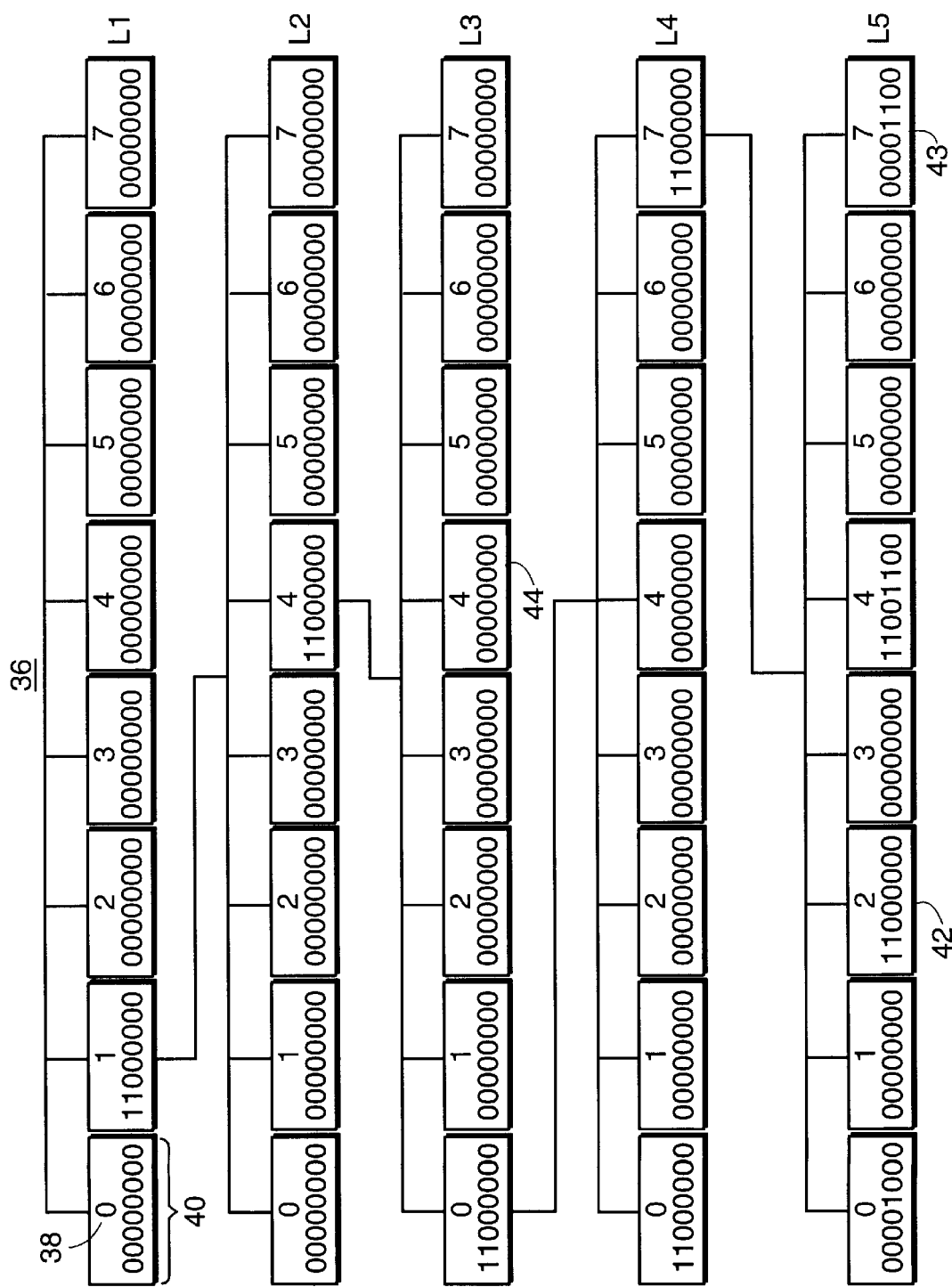
FIG. 3 is an example write tree structure for facilitating cache write backs to a disk logical volume.

An example write tree 36 capable of addressing a logical volume with up to 0×7FFF (hexadecimal 7FFF) addresses is shown in FIG. 3. The write tree 36 in this illustrative implementation is structured as a five-level tree with 8 bytes at the first level (L1). Each of the bytes for example, the first byte (see label 40) is addressable using addresses 0–7. The first byte (as shown by label 40) is at address zero (as shown by arrow 38) and is followed by 7 more bytes which each provide indications of write-back data stored at other levels of the write tree 36. Below each of the bytes 0 through 7 at level L1 are eight additional bytes at the next level, L2. For example, at level L2 there are eight bytes under each of the eight bytes at L1, therefore at L2 there are 64 bytes (8×8). This continues at each level. Therefore, for each of the 64 bytes at level L2 there is a corresponding eight bytes at level L3. This continues through level L4, and to level L5 which is the bottom level of the write tree 36. The write tree 36 in FIG. 3 only shows eight bytes at each level, although it is understood that each level actually includes eight times the number of bytes at the level above. Therefore, to represent the entire write tree 37,448 bytes (approximately 36K) are needed. In the embodiment according to the invention, this write tree 36 is stored in-part in cache memory 30 and in local memory on the Disk Adapter (DA) 34.

Since each level of the write tree 36 has eight addressable units (the eight bytes), only 3 address bits are needed to access each of the five levels, which is octal (base eight) addressing. Therefore to access the write tree 36, 15 bits (one bit less than 2 bytes) are needed to access a logical volume with 0×7FFF addressable cylinders. Other configurations and set ups for the write tree 36 are possible and are all useable for the present invention, as will be discussed hereinbelow. For example, a four-level write tree with 16 addressable bytes at each level can be used to provide 0×FFFF addressable cylinders.

Accessing the write tree 36 generally comprises reading sequential parts of the two byte address for each level of the write tree. For example, take a cylinder address of 0×183A. The address for this in binary is 00011000 00111010. In using this address as octal, there are five levels to the write tree 36 with three bits used for each level, therefore only 15 of the 16 bits in the two byte address are used. The most significant bit is ignored. Thus for accessing the write tree 36, the number in octal is 14072. This number is obtained by dividing the two byte address into three bit pieces, and ignoring the most significant bit. Now referring to FIG. 3, at level L1, the byte 1 (using zero-based counting) is referenced. At level L2, byte 4 (of the eight bytes under byte 1 at level L1) is referenced. At level L3, of the eight bytes under byte 4 at level L2, byte 0 is referenced. Continuing down, at level L4, byte 7 (under the corresponding byte at level L3) is referenced, and finally at level L5 the second byte is referenced, as shown by label 42. This shows how the write tree 36 is traversed for the octal address 14072.

The bytes at each level of the write tree 36 indicate pending write-backs and format-backs for corresponding cylinders. As a host adapter 26 FIG. 2 modifies data in the cache memory 30, it modifies the bytes in the write tree 36 to indicate that a write-back or a format-back (or both) of the data in the cache memory 30 must be performed. Each byte of the write tree 36 serves as a mask which indicates which disk volumes 34 have pending write-backs to corresponding cylinders in those disk volumes 34. The location in the write tree 36 corresponds to the cylinders, the bytes in the write tree 36 are masks which correspond to the disk volumes 34. As used in the illustrative embodiment, the system 20 can have up to four disk volumes 34 for each logical volume. Each disk volume 34 needs a binary indication of a write-back, and a format back. Therefore eight bits are needed to indicate a write-back and a format-back for each of the four disk volumes. These eight bits form the byte at each location in the write tree 36.

In the illustrative embodiment, the most significant bit of the byte mask indicates a write-back for the first disk volume 34. The next sequential bit indicates a write-back for the second disk volume. The next two sequential bits each indicate write-backs for corresponding third and fourth disk volumes 34. The next four bits provide indications of format-backs to the four corresponding disk volumes in the same manner. For example, a write-back to the first disk volume would yield a byte mask of 10000000 (0×80). A format-back to both a first and second disk volume would yield a byte mask of 00001100 (0×0C). If less than four disk volumes 34 are present, the corresponding bits are unused.

Returning to the previous example, in the system 20 with two disk volumes 34a and b, the data in cache memory 30 corresponding to cylinder address 0×183A is modified. The host adapter 26 which modified the data in cache memory 30 must now update the write tree 36 to indicate the changed data should be written back to the disk volumes 34a–b. The disk volumes 34 both must have the changed data written back, and therefore both require a write-back bit set. The correct byte mask to use in this example is ×C0 (11000000).

The host adapter 26 uses the octal version of the cylinder address, 14072, and at each level in the write tree 36, sets the appropriate mask to be 0×C0. Since the write tree is continuously accessed and modified by several components, the bytes may have other bits already set. Therefore the host adapter 26 modifies the appropriate bytes by an OR operation with the appropriate mask (0×C0). However, for this example, assume that the entire write tree is clear. To maintain coherency, the host adapter 26 sequentially modifies the write tree 36 from the bottom up. At level L5 byte 2 (see label 42) is set to be 0×C0. Note that this is byte 2 under byte 7 at level L4, and similarly up through all the levels, as addressed by the cylinder address 14072. At level L4, byte 7 is set to be 0×C0. Similarly, byte 0 at level L3, byte 4 at level L2, and byte 1 and level L1 are set. The host adapter 26 has now updated the write tree 36, and is finished.

Now the first disk volume 34a, through the disk adapter 32a, is in a state of scanning the write tree 36 for write-backs or format-backs. The disk volumes 34 may search for write-backs, format-backs, or both. For this example the first disk volume 34a is searching for both. Since the disk volume 34a is looking for write-backs and format-backs related only to itself, it searches the bytes of the write tree 36 for bits set in the write-back or format-back position for the first disk volume. Therefore it uses a search mask of 0×88 (10001000). The procedure will logically AND the search mask with a particular byte in the write tree 36 and test for a non-zero result. The second disk volume 34b would use a search mask of 0×44 (01000100).

While the host adapter 26 in this illustrative embodiment writes to the write tree 36 in a bottom up fashion, the disk volume 34a (actually the disk adapter 32a for the disk volume 34a) scans the write tree in a top down fashion. This guarantees that the write tree 36 does not become unstable while many different components are accessing the write tree 36, possibly simultaneously. The disk volume 34a starts scanning at a predetermined cylinder address (usually the present cylinder location of the read/write head in the disk volume), to find proximate write-backs, therefore requiring minimal movement of the read/write head.

For this example, the disk volume 34a is presently at cylinder 0×1900, from a previous read request. Since the write tree 36 is accessed in octal, the present cylinder address is 14400. The disk volume 34a starts at the top of the write tree 36, at byte 1 of level L1, and scans the byte there. The byte matches the search mask 0×88 (i.e. has a non-zero result when masked by the search mask). The disk volume 34a then moves down to level L2 of the write tree 36, and scans byte 4 there. It also matches. The disk volume 34a then moves down to level L3, where byte 4 does not indicate a hit (see arrow 44).

The disk volume 34a knows that there is a write-back for this disk volume 34a somewhere below byte 4 at level L2 of the write tree 36. The disk volume 34a therefore scans the bytes at level L3 below byte 4 at level L2. It scans the bytes on either side of the starting byte, starting one byte in each direction, then two bytes in each direction, thereby expanding the search while maintaining proximity. Starting at byte 4 (see arrow 44), the disk volume 34a applies the search mask 0×88 to bytes 3 and 5 (the illustrative embodiment checks left first, then right, but this is arbitrary). There is no hit. The disk volume 34a then checks bytes 2 and 6, with still no hit, and then bytes 1 and 7 with the same result. The disk volume 34a then checks byte 0, which does indicate a hit.

Proceeding down to level L4 (under byte 0 at level L3), the disk volume 34a scans for a match at level L4. The disk volume 34a now scans in one direction, in order to find the closest write back to the present location. Since at level L3, the match was found to the "left" (at an address less than the present address), at level L4 (and all subsequent levels), the disk volume 34a starts at the rightmost byte (byte 7) and scans to the "left" (looking for write backs closest to the present address, for example 14072 is closer to 14400 than 14033 is). The disk volume 34a finds a match at byte 7. Finally, at level L5 (under byte 7 at level L4) the disk volume 34a again starts at the rightmost byte and scans to the left looking for a match. Here, the disk volume 34a finds a match at byte 7 (see label 43). In this case the match is a format-back for the disk volume 34a. The disk volume 34a has therefore found the closest write-back to its present location. The read/write head present location is 14400 (octal), and the closest write-back as at location 14707 (octal).

Generally, after the disk volume 34a has destaged the write-back, the disk volume 34a then must update the write tree 36 to clear out the bits for that write-back. The disk volume 34a only clears the bits related to itself, since the other disk volumes 34b must also write out the data. Therefore, continuing with the present example, at level L5 the disk volume 34a resets byte 2 to be 0×80, therefore resetting the write-back bit for the first disk volume 34a. To avoid affecting any other bits, the disk volume 34a uses the mask 0×7F (01111111) in an AND operation with the appropriate byte. Continuing at level L5, the disk volume 34a continues scanning the bytes in the same direction as before, searching for other matches to its search mask. If other matches are found, the appropriate data is written out and the bytes are updated.

If all the bytes at level L5 are clear, then the disk volume 34a proceeds to level L4, and resets byte 7, therefore indicating that no other write-backs are presently pending below that byte in level L4. If all the bytes are clear at one level, the disk volume 34a must proceed to the next highest level and reset the appropriate byte, and scan the remaining bytes at this level. If all the bytes at this level are clear, the disk volume 34a must then repeat this process until it reaches the top of the write tree 36.

In this way, the write tree 36 is scanned and accessed to maintain the mapping of pending write-backs. The other disk volume 34b independently performs the same operations of scanning the write tree 36, performing write-backs or format-backs, and updating the write tree 36. Other disk volumes connected to the cache memory 30 through other disk adapters 32b are also scanning and updating their own write tree (not shown) in cache memory 30.

Since many components (including host adapters 26 and disk adapters 32) are constantly modifying the write tree 36, each component must properly update the write tree 36 before releasing the cache memory 30 to another contender. Also, components must avoid maintaining presumptions about the state of the write tree 36, since it is constantly changing.

The present invention provides a system for caching information about the write tree 36 to allow disk volumes 34 to avoid several accesses to the write tree 36 to scan for write-backs. The present invention maintains complete data security, wherein the cached data from the write tree 36 is always updated in case the cached data is no longer valid.

The illustrative embodiment of the present invention works by caching information from the bottom level of the write tree 36 in memory in the disk adapter 32. Each disk adapter 32 includes some random access memory for storage of data. This memory is very scarce, therefore only a minimal amount of memory can be used.

Figure 4:
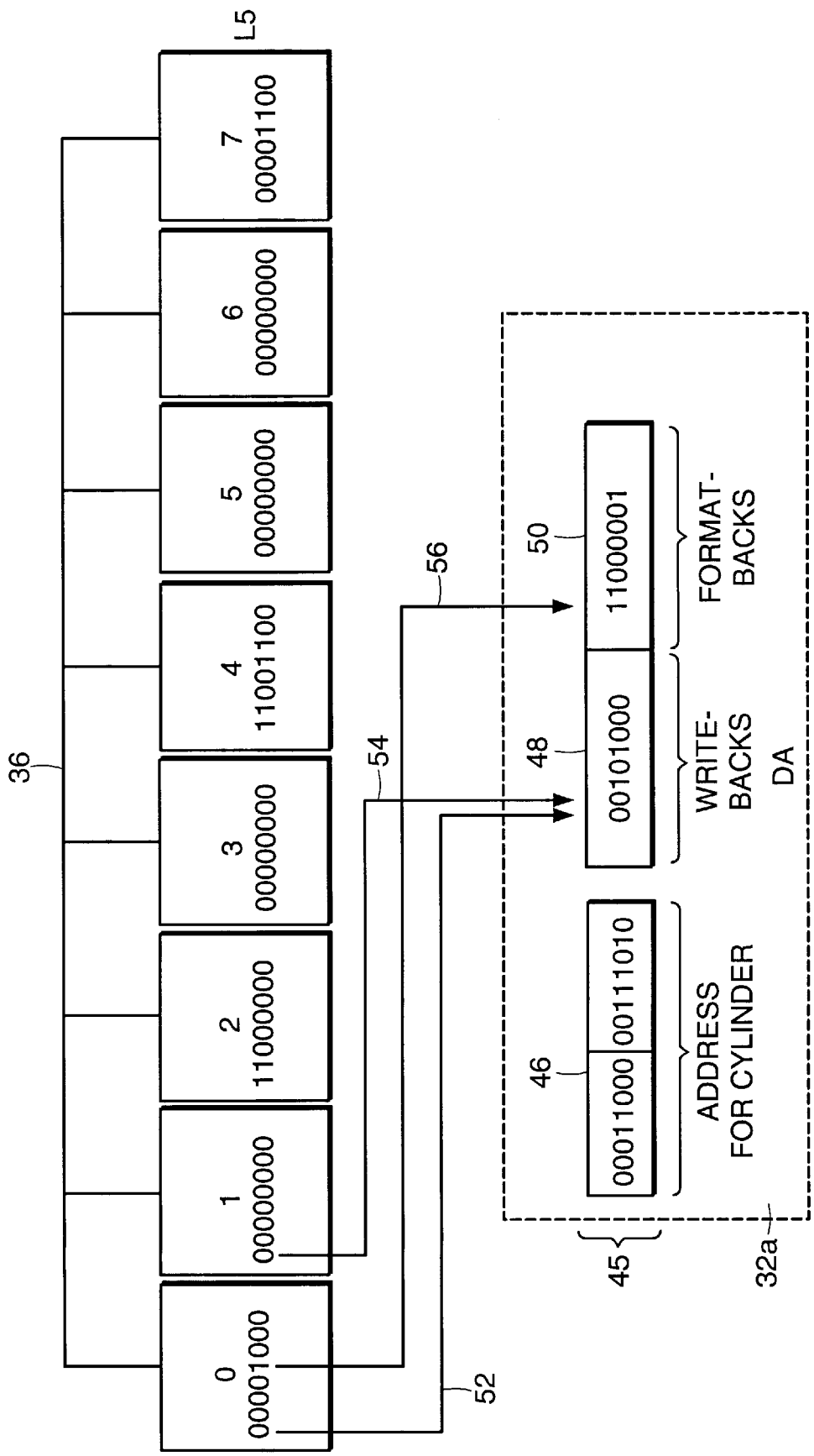
FIG. 4 is a block diagram showing the local caching of data from the write tree structure according to an illustrative embodiment of the present invention.

The illustrative embodiment uses only four bytes of the memory in the disk adapter 32a, FIG. 4 to establish a write tree cache 45. Two bytes 46 hold the cylinder address for the last read or write for the disk volume. The other two bytes 48 and 50 hold information concerning writebacks and format-backs respectively for the specific disk volume 34a. This information is for all the addressable cylinders at level L5 of the write tree 36. The first byte 48 holds information regarding write-backs from level L5, and the second byte 50 holds information regarding formatbacks from level L5.

The information stored in the two bytes 48 and 50 are the bits related to write-backs and format-backs for the first disk volume 34a. From byte 0 of level L5 of the write tree 36, the most significant bit indicates a write-back to the first disk volume 34a (as previously described). This bit is used as the first bit in the first byte 48, as shown by arrow 52. From byte 1 of level L5 of the write tree 36, the most significant bit is used as the second bit in the first byte 48, as shown by arrow 54. This is repeated for all eight bytes at level L5. Therefore the first byte 48 provides an indication of pending write-backs at level L5 for the first disk volume 34a.

Similarly the second byte 50 indicates format-backs for the first disk volume 34a at level L5. As shown by arrow 56, the bit representing a format-back to byte 0 at level L5 of the write tree 36 is used as the first bit in the second byte 50, and is repeated for all the bytes and level L5 (not shown).

In the illustrative embodiment, the bits are actually accessed and stored in the bytes 48 and 50 in big-ending format (most significant bit to the left) while the bits in the write-tree are accessed and stored in little-ending format. However, for clarity the bytes in the write tree 36 are shown using big-ending format. This detail is simply due to microprocessor preference of the processor in the disk adapters 32. Whatever format is used has no effect on system performance.

By caching the disk volume-specific data from the lowest level of the write tree 36 in cache memory 31 in the disk adapter 32, each disk volume 34 can avoid unnecessary accesses to the write tree 36 in global memory or cache 30 when searching for a next write-back, and thereby increase the overall efficiency of the system 20.

Figure 5:
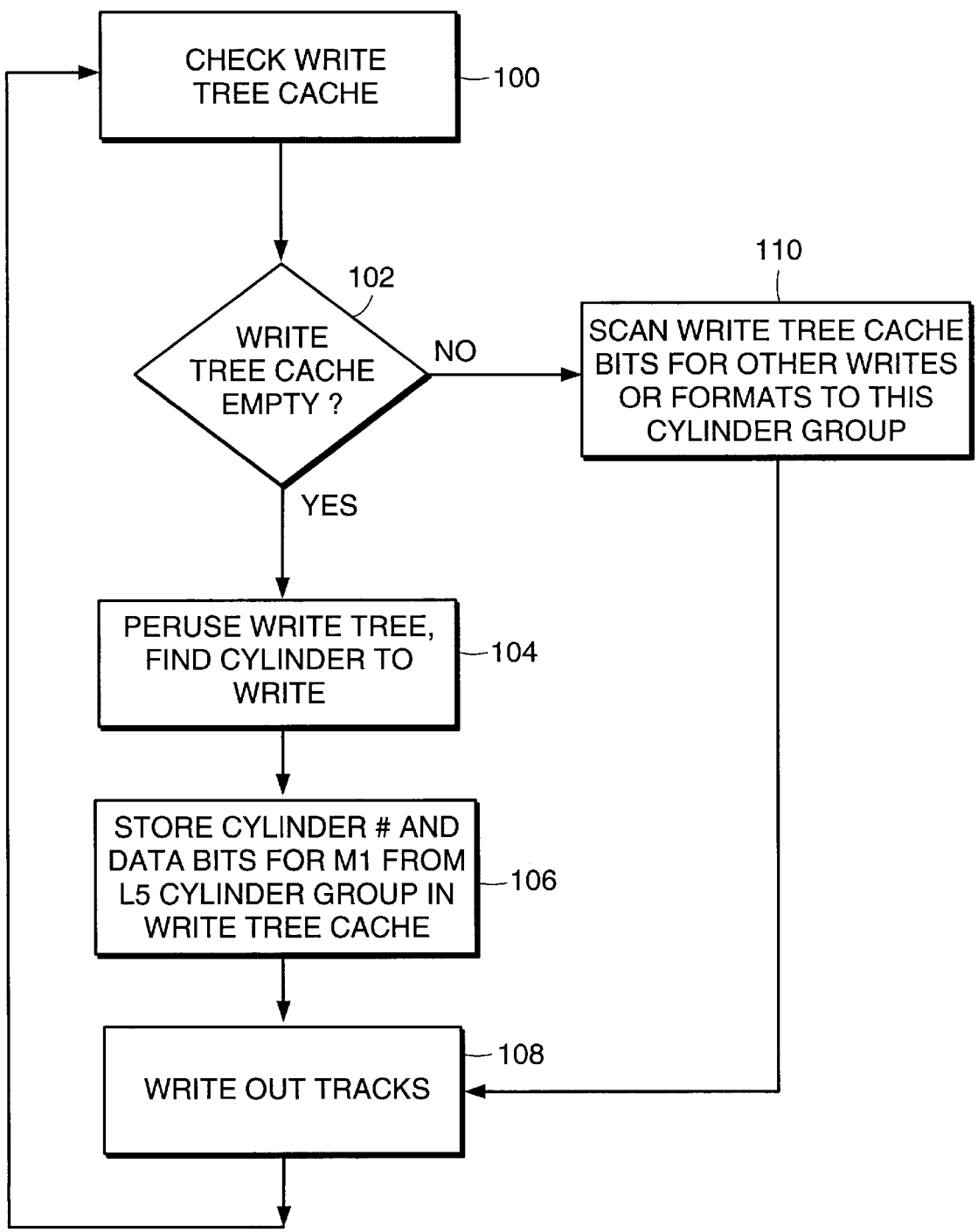
FIG. 5 is a flow chart of steps of creating and using local caching of data from the write tree structure according to the illustrative embodiment.

The steps performed by the illustrative embodiment are shown in FIG. 5. When its time to find a cylinder to write, first the write tree cache 45 is checked, step 100. Depending on whether pending write-backs or format-backs (or both) are being searched, the appropriate byte 48 or 50 FIG. 4 is checked. If the mask (bytes 48 and 50 FIG. 4) is zero (empty) step 102 FIG. 5, then the write tree cache 45 is invalid and a normal access and scanning of the write tree 36 from cache memory 30 is performed, step 104. Once the search for a cylinder is successful in the cache memory 30, the write tree cache 45 is updated, step 106. The cylinder address number found is put in the write tree cache 45, and then the mask (bytes 48 and 50) is created by looping through the eight bytes at level L5.

Next, the write-back is performed as usual, step 108. In this step the write tree 36 is also updated by clearing the appropriate bit to indicate the write-back has been performed. Also, the appropriate bit in the write tree cache 45 is cleared.

However, the attempted write-back may not be successful. As previously described, there are many states where the write-back can not be performed. In such cases, the present invention greatly increases efficiency because the next time a write-back is to be performed, another search of the write tree 36 is not necessary to locate a proximate write-back candidate. The present invention also provides other advantages, as will be described.

Whether the write-back at step 108 was successful or not, the next step which occurs when a write-back is to be performed, is to search the write tree cache 45, step 100.

If at step 102, the mask (bytes 48 and 50) is non-zero then the write tree cache 45 is valid. If the write tree cache 45 is valid, the mask is scanned to search for other pending write-backs or format-backs, step 110. In the illustrative embodiment, the write-back byte 48 is scanned first, to give precedence to write-backs over format-backs (assuming the system is searching for both write-backs and format-backs). A bi-directional search on the bits is done starting with the bit representing the last cylinder found (which is in the cylinder address cache 46). The search is done by one bit intervals in both directions—i.e. one bit to the left, and to the right, then two bits to the left and right etc. An appropriate input search mask is applied over the bytes 48 and 50 for the desired search pattern.

Once the write-back or format-back is found, the bit offset in the bytes 48 and 50 provide for determining the correct cylinder number. The write-back is then performed normally, step 108 (including updating the write tree 36 and write tree cache 45). It was not necessary to access the write tree 36 in order to find the next proximate write-back.

Additional considerations arise when the cylinder found via the write tree cache 45 cannot currently be written (for example it was updated too recently by the host adapter 26). In this case, the system 20 searches for another pending write-back in the write tree cache 45, but excludes the write-back just found. To do this, the bit for the write-back just found is cleared from the write tree cache 45 even though it is still write pending. Then if there are still set bits left in the bytes 48 and 50, then the search is repeated. If the write tree cache 45 becomes empty, a signal is sent indicating that a retry cannot be done and a complete new search of the write tree 36 must be performed. This is similar to the non-cached approach in that retries will be performed until extra cache memory 30 reads are needed, whereupon the system signals that a new search is needed.

Another consideration arises in the illustrative embodiment when it is used for multiprocessor/multi-node applications. For example, in a Symmetrix Multi Mirror Facility (SMMF) operation as provided by EMC, a disk volume 34 may legitimately clear pending write-backs for other disk volumes that exist on other nodes. In this case there is no easy way to clear the local write tree cache 45 of the other node. The solution is that when a mismatch occurs between the cylinder address found via the write tree cache 45 and the write and format pending flags in the cylinder header (normally an error indicating a mismatch requiring a retry), the write tree cache 45 is cleared and a normal write tree 36 lookup is performed. If the mismatch persists after a normal lookup, then the error is logged. In addition to the case mentioned above, any time any write tree 36 error is encountered, the write tree cache 45 is reset to allow a normal search next time, thereby maintaining coherence.

The illustrative embodiment is implemented in software using microcode instructions in the disk adapter 32. An example disk adapter 32 uses a microprocessor for executing microcode instructions. The present invention can also be implemented using hardware, firmware, microcontrollers or other systems, such as general purpose microprocessors. Further, a separate write tree cache 45 may be created in hardware separate from the disk adapter 32 and/or the write tree 36 could be implemented in a separate memory apart from the cache memory 30. Additionally, such hardware-implemented cache could support several disk volumes 34, and be implemented in any type of RAID system. This hardware-implemented write tree cache would be accessible by the system buses and perform write tree cache updating from the write tree 36 either independently of the write tree 36 accesses by the disk adapters 32, or through passive snooping of accesses to the write tree 36 by the disk adapters 32 over the system busses.

Although in the illustrative embodiment described herein the lowest level, i.e. level 5, is stored in cache in the disk adapter, other levels or multiple levels could be cached if greater amounts of memory are available. Similarly, less than full levels could be locally cached if lesser amounts of memory are available.

Although the embodiment described herein has cache on the disk adapter, the write tree cache could be other high speed, bus accessible cache, i.e. other than write tree cache in global memory. The present invention is also useful for read trees and trees of other I/O operations, such as partial writes, I/O data, and meta data may be stored in separate trees. Further, greater or fewer categories of information may be cached, such as other forms of meta data, other than the example write-backs and format-backs described with the illustrative embodiment.

Further, the present invention will work with any storage system which uses a cache memory and slow-access long term storage. For example, the present invention would work for a system with a single disk drive and cache memory, not just RAID systems.

Although the invention has been shown and described with respect to illustrative embodiments thereof, various other changes, omissions and additions in the form and detail thereof may be made therein without departing from the spirit and scope of the invention.

What is claimed is:

1. A system for optimizing write operations to at least one disk from a cache memory, said cache memory being accessible by at least one host processor and said at least one disk, said cache memory comprising:

a write tree stored in a first memory and organized into a plurality of levels, and indicating pending write operations to addressable units on said at least one disk;

an addressable unit value stored in a second memory, providing an indication of an addressable unit found in said write tree; and a bit mask, associated with said addressable unit value, and providing an indication of pending write operations to said at least one disk that are at a same level in said write tree as said addressable unit indicated by said addressable unit value;

wherein said system checks said bit mask when searching for pending writes operations to said at least one disk.

2. The system of claim 1 wherein pending writes operations include write-backs and formatbacks.

3. The system of claim 2 wherein said bit mask includes a first bit mask indicating write-backs and a second bit mask indicating format-backs for all addressable units at a same level in said write tree.

4. The system of claim 1 wherein said second memory is located in a disk adapter component coupled to said least one disk and said cache memory.

5. The system of claim 1 wherein said addressable unit value is a disk cylinder address.

6. The system of claim 1 wherein said system includes at least two disks, wherein said at least two disks store related data in identical addressable units, and said write tree indicates pending write operations for each of said at least two disks.

7. The system of claim 1 wherein said first memory is a portion of said cache memory.

8. The system of claim 1 wherein said system updates said bit mask with an indication of pending write operations to said at least one disk by accessing said write tree.

9. The system of claim 1 wherein if said system detects a mismatch between said indication of pending write operations in said bit mask an indication of pending write operations in said write tree, said system clears said bit mask.

10. The system of claim 1 wherein said system includes at least two disks, a portion of one of said disks stores redundant information corresponding to certain data stored on the other of said disks, and wherein said addressable units for said certain data and said corresponding redundant information correspond, and said write tree indicates pending write operations for each of said at least two disks.

11. In a storage system including a cache memory, at least one disk, and a write tree organized into a plurality of levels indicating pending write operations to addressable units on said at least one disk, a method of caching write tree information comprising:

upon accessing said write tree, storing in a memory an indication of an addressable unit found in said write tree;

scanning for indications of pending write operations at a predetermined level in said write tree and proximate said addressable unit in said write tree; and storing in said memory a bit mask providing an indication of pending write operations detected from scanning said predetermined level in said write tree.

12. The method of claim 11 further including:

scanning said bit mask for pending write operations; and if no pending write operations are detected from scanning said bit mask, then accessing said write tree to detect pending write operations.

13. The method of claim 12 wherein said step of scanning said bit mask for pending write operations includes scanning bits in said bit mask which are proximate a bit which corresponds to said addressable unit in said write tree.

14. The method of claim 13 wherein if said scanned bits in said bit mask which are proximate a bit which corresponds to said addressable unit in said write tree are clear, then sequentially scanning bits in said bit mask which are further away from said bit which corresponds to said addressable unit in said write tree.

15. The method of claim 11 wherein said step of storing in said memory includes storing in a memory separate from said cache memory.

16. The method of claim 11 wherein said write tree is stored in said cache memory.

17. The method of claim 11 further including:

clearing said bit mask if a mismatch is detected between an indication of pending write operations in said bit mask and an indication of pending write operations in said write tree.

18. A data storage system comprising:

at least one disk;

a cache memory, coupled to said at least one disk;

a write tree, stored in said cache memory and organized into a plurality of levels and indicating pending write operations to addressable units on said at least one disk;

an addressable unit value stored in a separate memory, providing an indication of an addressable unit found in said write tree; and a bit mask, stored with said addressable unit value in said separate memory, and providing an indication of pending write operations to said at least one disk that are at a same level in said write tree as said addressable unit indicated by said addressable unit value;

wherein said data storage system checks said bit mask when searching for pending writes operations to said at least one disk.

* * * * *